No. 645,125. Patented Mar. 13, 1900.
W. H. PRATT.
ALTERNATING CURRENT METER.
(Application filed June 7, 1899.)
(No Model.) 2 Sheets—Sheet 1.
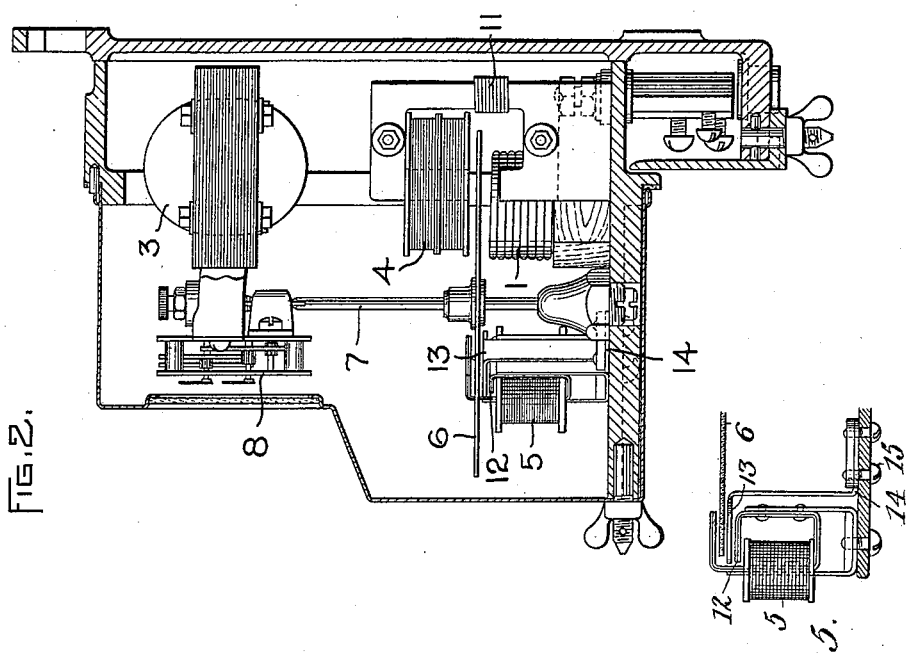
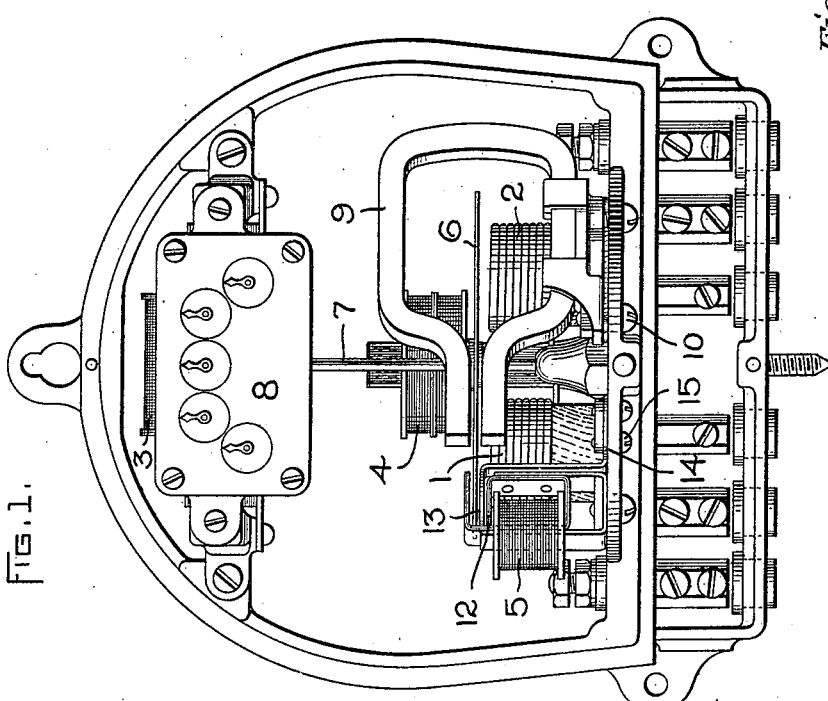
WITNESSES.
A. H. Abell.
A. F. Macdonald.
INVENTOR.
William H. Pratt
by Albert G. Davis
Atty.

No. 645,125. Patented Mar. 13, 1900.
W. H. PRATT.
ALTERNATING CURRENT METER.
(Application filed June 7, 1899.)
(No Model.) 2 Sheets—Sheet 2.
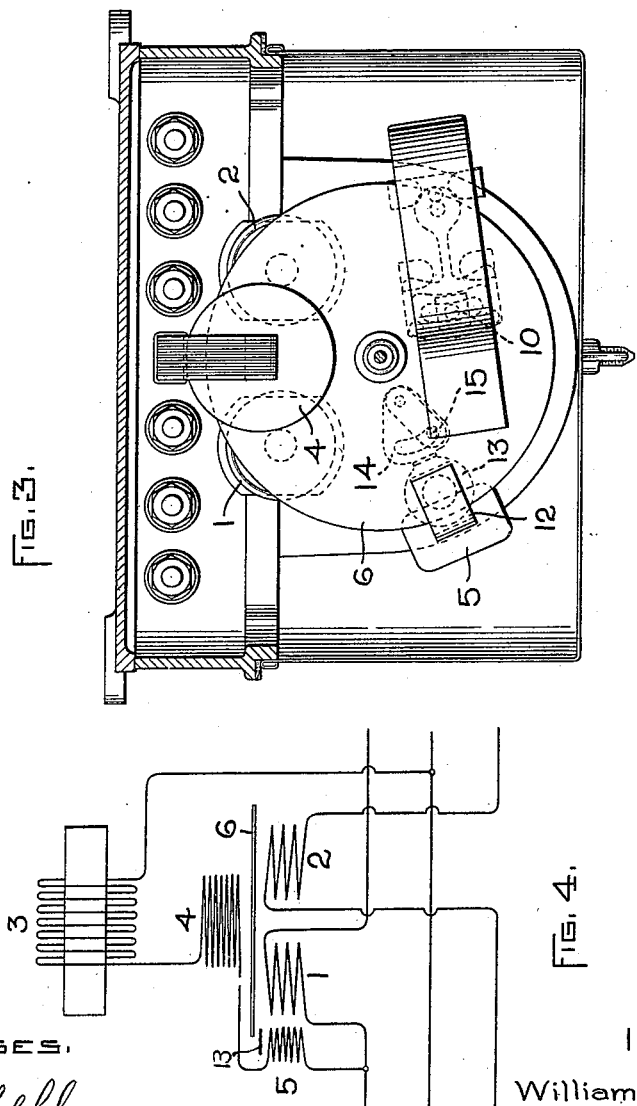
Witnesses:
A. H. Abell.
A. F. Macdonald.
Inventor:
William H. Pratt,
by Albert G. Davis
Atty.

UNITED STATES PATENT OFFICE.

WILLIAM H. PRATT, OF LYNN, MASSACHUSETTS, ASSIGNOR TO THE GENERAL ELECTRIC COMPANY, OF NEW YORK.

ALTERNATING-CURRENT METER.

SPECIFICATION forming part of Letters Patent No. 645,125, dated March 13, 1900.

Application filed June 7, 1899. Serial No. 719,704. (No model.)

*To all whom it may concern:*

Be it known that I, WILLIAM H. PRATT, a citizen of the United States, residing at Lynn, in the county of Essex, State of Massachusetts, have invented certain new and useful Improvements in Alternating-Current Meters, (Case No. 995,) of which the following is a specification.

This invention relates to meters for alternating-current circuits, the object being to provide an integrating wattmeter of the induction-motor type which will correctly register the energy consumed in an alternating-current circuit or circuits.

In meters of the induction type as commonly organized a metallic disk connected to a registering-train is given a torque by two coil systems, one of which is in a potential circuit in shunt to the mains or otherwise furnished with a current proportional to the potential difference across the mains and the other in series with the work or otherwise furnished with a current varying in magnitude and phase with the current to be measured, the current in the potential circuit being retarded in phase approximately ninety degrees behind the impressed electromotive force by interposing suitable reactance in the shunt-circuit. With this arrangement and with non-inductive load the torque varies directly as the product of the current through the series coil by the electromotive force at the shunt-terminal. If there be inductive load on the work-circuit, as induction-motors, the wattless component of the current is not measured by the meter, since the torque is reduced by the reduction in the phase displacement between the current and potential fluxes. A source of error in such meters results from the friction of the parts and from a tendency sometimes to run fast on light load or even to run on no load, due to a dissymmetry of the shunt-coil. My invention is designed to obviate these difficulties. I carry it out by providing in the shunt-circuit an auxiliary coil inductively related to the torque-producing disk and usually out of inductive range of the motive coils and providing it with an adjustable magnetic shading device by which a creeping or shifting polar field may be effected, thereby exerting a slight forward torque on the disk, sufficient only in value to balance the friction of the parts, thus affording an initial tendency of the meter to move in the proper direction, but a tendency which does not disturb the accuracy of its record, but improves it. The reactance of this auxiliary coil is small as compared with the reactance of the balance of the potential circuit, so that the adjustment of its shading-piece will have but an insignificant effect upon the total reactance of that circuit and will have no appreciable effect on the constant of the meter at full load. Heretofore shading-pieces have been used in connection with the main-potential coil; but their use in that relation is objectionable, since their adjustment disturbs the phase relation of the torque-producing circuits, and thus materially affects the constant of the meter, since a change of adjustment changes the reactance of the shunt-coil, which of necessity constitutes a very considerable proportion of the entire reactance of the potential circuit.

In the drawings, Figure 1 is a side elevation of a meter embodying my improvements with its cover removed. Fig. 2 is a central vertical section. Fig. 3 is a median horizontal section looking toward the torque-producing mechanism. Fig. 4 is a diagram showing the circuit connections for one type of alternating-current circuit, and Fig. 5 is a view of a detail.

Referring first to the diagram, 1 2 represent two series coils, preferably having air or non-inductive cores, connected in series relation to the consumption-circuit.

3 is a reactance.

4 is a coil of high impedance, having a laminated core confronting the face of a disk of aluminium, copper, or other good conducting metal, and symmetrical in relation to the series coils 1 and 2 on the opposite side of the disk.

5 is an auxiliary coil of small reactance located, preferably, at a point out of inductive range of the current-coils 1 2 of the meter.

13 is a shading device in inductive relation to the coil 5 and between it and the meter-disk. This relation is not absolutely essential, as the stray field from the auxiliary coil acts merely to assist or oppose the field from the high-potential coil 4. The auxiliary coil is provided with a thin iron core bent, as indicated in Fig. 5, so as to embrace a part of the disk 6 and supported from the base of the meter-frame. The reactance of the circuit including the coils 3, 4, and 5 is adjusted so as to produce as nearly as may be a ninety-degree phase separation between the current in said circuit and the impressed electromotive force. By far the greater portion of the inductance is in the coils 3 and 4, the small reactance of the coil 5 being insufficient to appreciably disturb the phase separation of the series and shunt-wound circuits by changes of its adjustment. In coöperative relation to the field or poles of this coil I mount an adjustable piece of copper capable of swinging through its field of force, so as to provide a variable torque not only to compensate different degrees of starting-friction, but also to correct any tendency of the meter to run backward.

The relations and construction of the parts will be better understood from an examination of Figs. 1, 2, 3, and 5, in which, as will be seen, the shunt-coil 4 is supported in the frame so that its pole-face confronts the upper side of the metallic disk 6 in symmetrical relation to the series coils 1 and 2, supported beneath the disk. The disk is affixed to a vertical shaft 7, which gears into a registering-train suitably mounted in a frame 8. A permanent magnet 9 is mounted on the frame so that its pole-pieces may embrace the disk near its periphery, the position of the magnet being adjustable, as indicated in Fig. 3, by a set-screw 10, engaging the walls of a slot in the adjustable piece which supports the magnet, the set-screw passing through a part of the frame. On the core of the shunt-coil 4 is a closed-circuit coil 11, which acts to retard the phase of the magnetism due to the shunt-coil, and thus contribute in effecting a ninety-degree separation of the phases on non-inductive load, necessary to an accurate integrating function of the meter. The auxiliary coil 5, which constitutes the essential feature of my invention, has a core 12, composed of a few laminæ of soft iron, bent so as to embrace the edge of the disk 6. Between the disk and one of the faces of these polar extensions is an adjustable piece of metal 13, preferably formed in the shape of a ring, as indicated in Fig. 3, one end of the strip of which the ring is formed being bent to pass between the pole-piece 12 and the edge of the disk 6 and the other bent so as to rest on the base of the instrument, the horizontal arm (shown at 14 in Figs. 1 and 3) being pivoted on the base and provided with a slot coöperating with a set-screw 15, by which the position of the ring 13 may be adjusted with relation to the pole-piece. This ring acts as a shading-coil, the influence of the induced currents set up by the alternating magnetomotive force of the poles being to create a creeping or shifting tendency in the magnetic field, and thus exert a torque on the disk 6. This torque may be varied by shifting the position of the shading-piece 13 away from a central relation to the pole-face. The wide range of adjustment given this shading-piece permits not only a forward adjustment to balance the friction of the parts, but in some cases a backward rotary effect on the disk to compensate a forward initial tendency sometimes existing in the meter by reason of a lack of symmetry in the potential coil, which gives the meter a tendency to run too fast or even to run on no load.

The details of construction of the meter will be sufficiently understood from the drawings without further description, suitable provision being made for inclosing the parts and sealing them, as indicated.

The meter is shown as provided with six terminals, which adapt it for connection with a three-wire single-phase circuit, as exemplified in Fig. 4. The meter, however, is adapted for operation on any circuit and may be used with a single-phase two-wire system or a multiphase system.

What I claim as new, and desire to secure by Letters Patent of the United States, is—

1. An alternating-current meter having a registering device operated by an induction-motor, and an auxiliary torque-producing device for overcoming the friction of the parts inductively independent of the primary motor-circuits.

2. An alternating-current meter having a register operated by an induction-motor, the primary circuits of which are in shunt and series relation to the work-circuit respectively, and an independent starting-coil in the shunt-circuit for overcoming the friction of the parts.

3. In an alternating-current meter, recording mechanism, an induction-motor fed with current proportional to the load operatively related to the recording mechanism, a starting-coil for overcoming the friction of the parts in shunt to the mains, and a shading device adjustable with relation to the pole of the starting-coil for varying its torque.

4. An electric meter for alternating currents, provided with a register, an induction-motor for operating the same, the primary circuits of which are essentially in series and shunt relation to the work measured by the meter, and an auxiliary motive device for counterbalancing the friction of the mechanism in the shunt-circuit and of low reactance relatively to the aggregate reactance of said circuit.

5. In a meter for alternating-current circuits, a series winding, a shunt-winding, an auxiliary winding, and means in coöperative relation with said auxiliary winding for producing a creeping or shifting magnetic field.

6. In a meter for alternating-current circuits, a winding in series with the mains, a winding in shunt to the mains, means for giving the shunt-circuit a large reactance, and an auxiliary torque-producing device having a small reactance in series with said shunt-winding.

7. In a meter for alternating-current circuits, a winding in series with the mains, a winding in shunt to the mains, means for giving the shunt-circuit a large reactance, an auxiliary winding having a small reactance in series with said shunt-winding, and means in coöperative relation with said auxiliary winding for producing a shifting or creeping field.

8. An electric meter for alternating currents having an induction-armature connected with the recording device, two circuits inductively related thereto, one in series and the other in shunt with the work, and a starting-coil of small reactance acting upon the recording device and provided with an adjustable magnetic shading device to produce a shifting polar field.

9. An electric meter for alternating-current circuits, having an induction-armature connected with a recording device, two circuits having windings inductively related to said armature, one a series circuit of low reactance and the other a shunt-circuit of high reactance, a starting-winding of low reactance in said shunt-circuit, and an adjustable shading device in coöperative relation with said starting-winding.

In witness whereof I have hereunto set my hand this 5th day of June, 1899.

WILLIAM H. PRATT.

Witnesses:
DUGALD MCKILLOP,
ROBERT SHAND.